United States Patent [19]

Marom

[11] 3,740,749

[45] June 19, 1973

[54] INCREASED FIELD OF VIEW DETECTOR ARRAY

[75] Inventor: Emanuel Marom, Tel Aviv, Israel

[73] Assignee: The Bendix Corporation, Southfield, Mich.

[22] Filed: Feb. 22, 1971

[21] Appl. No.: 117,535

[52] U.S. Cl............................. 343/100 LE, 343/118
[51] Int. Cl............................................... G01s 3/16
[58] Field of Search .............. 343/100 LE, 113 DE, 343/118

[56] References Cited
UNITED STATES PATENTS

| | | | |
|---|---|---|---|
| 2,721,321 | 10/1955 | Page ............................... | 343/118 X |
| 3,484,167 | 12/1969 | Burns, Jr......................... | 343/106 X |
| 2,215,785 | 9/1940 | Gallant et al. ............... | 343/118 UX |

Primary Examiner—Benjamin A. Borchelt
Assistant Examiner—Richard E. Berger
Attorney—Lester L. Hallacher and Plante, Hartz, Smith & Thompson

[57] ABSTRACT

A system for increasing the field of view of an array of detectors is described. The system also unambiguously identifies the location of a target with respect to the array. The increase of the field of view and the unambiguous locating of the target are obtained by oscillating the detector array about an axis which passes through the plane of the detector array. The angle of oscillation is related to the wavelength of the detected radiation and the separation of the detectors so that a target falling within the main lobe or either side lobe is detected and unambiguously located.

11 Claims, 6 Drawing Figures

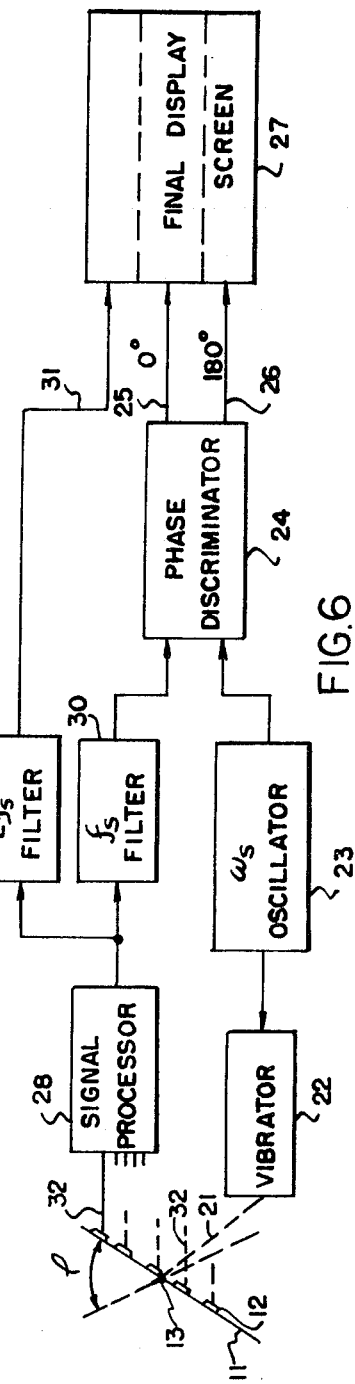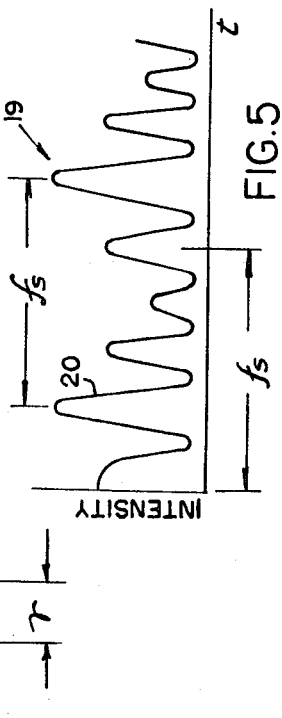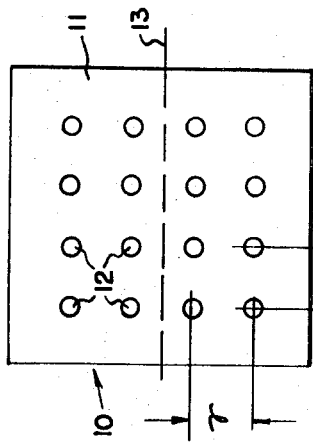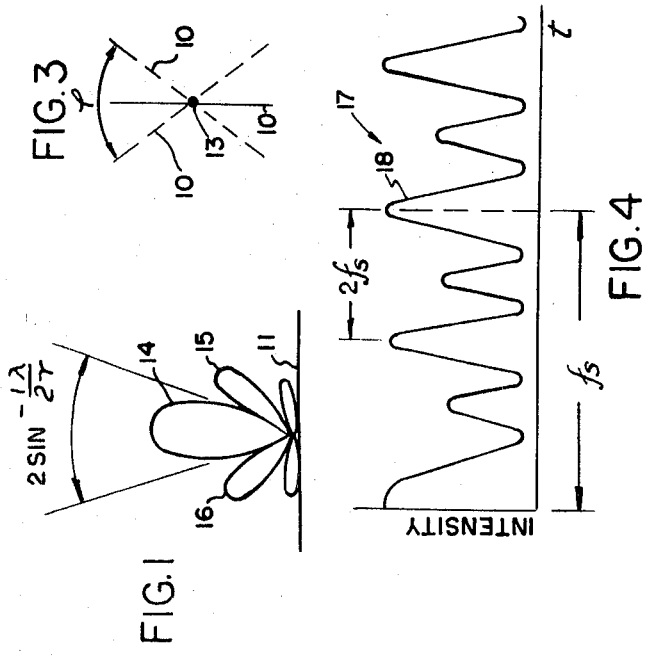

INCREASED FIELD OF VIEW DETECTOR ARRAY

CROSS-REFERENCE TO RELATED APPLICATIONS

Application Ser. No. 79,156, filed Oct. 8, 1970 by R. K. Mueller, entitles INCREASED FIELD OF VIEW DETECTOR ARRAY, assigned to Bendix Corporation.

BACKGROUND OF THE INVENTION

Radiation sensitive detectors are used for a variety of applications. Ordinarily, the detectors are sensitive to electromagnetic radiation such as infrared, visible light, or microwaves. The individual detectors within the arrays are systematically arranged in a pattern so that a uniform spacing exists between the individual detectors. The field of view of the array is dependent upon the spacing between the detector elements within the array and also upon the wavelength of the detected radiation. Thus, with the spacing of $\gamma$ between detectors and a radiation wavelength of $\lambda$, the angular field of view $\theta$ is defined as $\theta = 2 \sin^{-1} \lambda/2\gamma$. Because the angular field of view is dependent upon the spacing $\gamma$ an increase in field of view for a given wavelength of radiation can be obtained only by decreasing the spacing $\gamma$. This requires an increase in the number of detectors employed within the array and, therefore, is subject to economic considerations.

An operational difficulty of existing detector arrays stems from the inability to uniquely interpret the location of a target within the detected signal. A target which is located at an angle of $\lambda/\gamma$ from the normal to the array can be misinterpreted as being positioned at a 0° angle. That is, along the normal to the array. This results in an ambiguity in the position information which substantially limits the usefulness of the detector system.

SUMMARY OF THE INVENTION

The inventive system effectively doubles the angular field of view of a planar array of detecting elements and also presents an output which unambiguously yields the positioning of a target within a field of view of the array. These improvements are achieved by vibrating, or oscillating, the detector array about an axis which passes through a centerline of the plane containing the detector array. The angle of oscillation of the array is made equal to the angular separation of the main lobe and the side lobes of the radiation detection pattern. Oscillation occurs at a constant frequency which is convenient and readily detected. An increase in the field of view is realized only in the plane in which vibration occurs. Accordingly, there is no field of view increase in the planes perpendicular to the plane of vibration. A system for increasing the field of view in another plane is described in application Ser. No. 79,156 referenced hereinabove.

Because of the continuous motion of the array, targets appear and disappear from the detection pattern in accordance with their location with respect to the radiation pattern. Accordingly, targets located within the main lobe have an intensity which fluctuates at twice the oscillation frequency of the array. Targets located within a side lobe have an intensity which fluctuates at the oscillation frequency. The phase of these oscillations with respect to the phase of the oscillation of the array is indicative of whether the target is within the upper or the lower side lobe.

The frequency of fluctuation of the detection pattern intensity and the phase of the fluctuation with respect to the oscillation of the array are readily detectable with simple circuitry, and accordingly the principles of the invention are readily applicable and useful with simple and inexpensive circuitry and the array can be fabricated using integrated circuit techniques.

BRIEF DESCRIPTION OF THE DRAWINGS

FIG. 1 shows the radiation detection pattern of the detector array.

FIG. 2 is a simplified showing of a detector array.

FIG. 3 is a side view of the detector array of FIG. 1 and shows the manner of oscillating the array.

FIG. 4 is a waveform representing the intensity variation of the detected signal when the target is present on the main lobe.

FIG. 5 is a waveform representing the intensity variation of the detected signal when the target is present on one of the side lobes.

FIG. 6 is a block diagram of a preferred embodiment of a circuit useful with the inventive concept.

DETAILED DESCRIPTION OF THE INVENTION

An array of radiation detection elements which is useful with the inventive concept is illustrated in FIG. 2. A planar surface 11 contains a plurality of identical radiation detectors 12 which are systematically arranged on the surface 11. The detectors can be responsive to visible light, infrared light, or any type of energy which is intended to be detected. Photodiodes are a specific example of detection elements which are responsive to light. The radiation detectors 12 are uniformly spaced by a distance $\gamma$ along the directions of the two axes of the plane 11. An axis 13, which passes through a centerline of the plane 11, serves as the vibratory rotational axis of the array.

The radiation detection pattern of the array 10 shown in FIG. 2 is illustrated in FIG. 1. In this figure the plane 11 is represented as a straight line and the radiation detection pattern extends outwardly perpendicular to the planar surface 11. The radiation detection pattern consists of a main lobe 14 and an upper and lower side lobe 15 and 16, respectively. In the prior art systems, the field of view of the array 10 is confined to the main lobe 14 and is dependent upon the wavelength of the frequency of the radiation detected and also the spacing between the detecting elements 12. The angular field of view $\theta$ of the array is, therefore, defined as $\theta = 2 \sin^{-1} \lambda/\gamma$.

In prior art systems, the angular field of view of the array must be confined to the main lobe 14 because targets present on the side lobes 15 and 16 cannot be uniquely identified as being located on a particular side lobe. This results in an ambiguity relative to the positioning of targets present on the side lobes. Accordingly, a target which is located at an angular disposition of $\lambda/\gamma$ with respect to the normal to the array, can be misinterpreted as being located at a 0° angle. The ambiguity of the location of targets present on the side lobes 15 and 16 occurs because targets which are present on the side lobes result in radiation detection patterns which differ from one another only in phase. In the prior art system, there is no phase reference which can be used to uniquely determine which of the side lobes is carrying the target, and the side lobe information is therefore ambiguous and cannot be used.

The inventive system overcomes these disadvantages by providing a means for establishing a phase reference so that the presence of a target on either of the side lobes can be uniquely identified with respect to the particular side lobe and while simultaneously providing a means for effectively doubling the field of the detector array. This is accomplished by mounting the detector array 10 such that it can be vibrated about the axis 13 at a constant frequency $f_s$. The vibration occurs such that the array moves in and out of its plane of rest; in the FIG. 2 illustration this is the plane of the paper. This is more readily understood by viewing FIG. 3, where the axis 13 is perpendicular to the plane of the paper and vibration occurs through the angle $\rho$ as indicated by the broken line positions of the array 10.

By selecting the angle $\rho$ to be equal to the angular separation between the centerline of the main lobe 14 and the side lobe 15, the effective angular field of view of the detector array can be essentially doubled and at the same time a unique determination of the presence of a target on a side lobe 15 or 16 can be made. The angle of rotation $\rho$ is therefore made equal to $\sin^{-1} \lambda/\gamma$.

Because of the continuous motion of the array, targets will appear and disappear according to their location with respect to the radiation detection pattern of FIG. 1. Accordingly, targets which are located within the main lobe 14 will have an intensity fluctuating at a frequency equal to twice the vibration frequency $f_s$ ($2f_s$) while those targets which are located within one of the side lobes 15 or 16 will appear to have a fluctuation at the vibration frequency of $f_s$.

This is illustrated in FIGS. 4 and 5. In FIG. 4, a target appearing on the main lobe 14 will cause the detection signal 17 to have an intensity fluctuation such that the intensity peaks occur during those instances in which the target is present within the main lobe. This is illustrated by the higher amplitudes 18 of the waveform 17. The higher amplitudes 18 occur at a frequency of $2f_s$. As the detector array 10 vibrates at a frequency $f_s$, the target will appear and disappear from the detection pattern. The peak intensity amplitudes 18 occur when the target is present on the main lobe. This occurs for both directions of vibratory movement of the array.

FIG. 5 illustrates the detected intensity variation when a target is present within one of the side lobes 15 or 16 of the detection pattern shown in FIG. 1. In this case, the detected radiation pattern 19 has intensity increases represented by the peak amplitudes 20 when a target is present on one of the side lobes 15 or 16. The peak amplitudes occur at a frequency of $f_s$.

The location of the target within the detection pattern illustrated in FIG. 1 can, therefore, be made by analyzing the detected patterns shown in FIGS. 4 and 5. When the detection pattern has an intensity fluctuation occurring at a frequency of $2f_s$ the target is located on the main lobe 14. An intensity fluctuating at a frequency of $f_s$ indicates that a target is located on either of the side lobes 15 or 16. If the phase of the fluctuation for a side lobe presentation is in phase with the oscillation frequency of the array, the target is present on the upper side lobe and if the phase of the fluctuation is 180° out of phase with the array oscillation the target is present on the lower side lobe. For this reason, the exact location of a target within the detection pattern is readily determined and the presence of a target on either of the side lobes can be unambiguously identified by use of simple and well known circuit components.

A block diagram of the preferred embodiment of a circuit employing the concepts of the inventive technique is illustrated in FIG. 6. The system includes an oscillator 23 which yields an output signal having a frequency equal to that desired for the operation of the system. The output of oscillator 23 actuates the vibrator unit 22 which is mechanically coupled to the detector array 10 by a mechanical linkage illustrated schematically by dashed line 21. The vibrator unit can be any of several mechanical elements available, such as, for example, a motor and crank arrangement. The diode array 11 is arranged to oscillate through an angle $\rho$ about the axis 13 at a frequency $f_s$.

The electrical output indications produced by the individual detector elements 12 in response to receive radiation are coupled to the input of a signal processor circuit 28 by input lines 32. Obviously, each of the detectors 12 is electrically coupled to signal processor 28. The signal processing circuit 28 will include the required amplifiers, noise reduction circuitry, and other circuitry required for cleaning the received signals such that they can be more effectively used within the inventive system. The operational characteristics and functions of the individual elements and circuits within the signal processing circuit 28 are well known to those of ordinary skill in the art and, therefore, additional details are not required herein.

It should be noted that the intensity of the input to the signal processor 28 is dependent upon the presence of a target within the detection pattern shown in FIG. 1. If the target is present within the main lobe 14, the waveform illustrated in FIG. 4 will be input to the processor circuit. Alternatively, if the target is present within one of the side lobes 15 and 16, the waveform illustrated in FIG. 5 will be input to the signal processor 28.

The output of the signal processor 28 is coupled to a $2f_s$ filter 29 and a $f_s$ filter 30. These filters have different band pass capabilities and separate the signals indicative of the intensity fluctuation according to the two frequencies $f_s$ and $2f_s$. Accordingly, the output of the filter 29 present on the output lead 31 will be indicative of a target present on the main lobe and an output from filter 30 is indicative of a target on one of the side lobes.

The output from the $f_s$ filter 30 is input to the phase discriminator 24 along with the output from the oscillator 23. The phase of the output of filter 30 is, therefore, compared to the vibratory phase of the detector array, and accordingly the output of the phase discriminator 24 which is present on either of the output lines 25 or 26 will be indicative of the phase relationship between the oscillation frequency of the array and the phase of the detected intensity fluctuation. A 0° relationship between these two signals indicates the presence of a target on the side lobe 15, while a 180° relationship between these two signals is indicative of the presence of a target on the side lobe 16. The outputs from the three leads 25, 26, or 31 are input to a final display screen 27 where they can be used to give a visual indication of the presence of a target within the radiation pattern. It should be noted that this display screen can be any of several types available in the art, such as a cathode ray tube.

It should be noted that, if desired, an internal signal display can be incorporated between the output of the signal processor 28 and the inputs to the filters 29 and 30. In this manner, the combined, or total, signal before it is filtered can be internally viewed, if so desired.

It is now evident that the inventive concept substantially increases the angular field of view of a detector array and simultaneously provides a means for unambiguously positioning a target on a side lobe of the radiation pattern. The angular field of view is substantially increased because the main lobe 14 is moved with respect to the planar array and therefore in effect is increased in width, and also because the information relevant to targets which are present on the side lobes can be unambiguously interpreted and therefore is useful information as distinguished from the prior art systems where any side lobe information is essentially useless and is actually detrimental rather than advantageous.

What is claimed is:

1. A system for increasing the angular field of view of an array of radiation detectors systematically arranged and spaced by a distance $\gamma$ and for unambiguously determining the presence of targets present on the main lobe and side lobes of the radiation pattern of said array comprising:
    means for oscillating said array through an angular excursion and at a constant frequency about an axis within the plane of said array and for generating an array oscillating signal indicative of the oscillating frequency and phase of said array; and
    frequency sensitive means for receiving the output of said array and said array oscillation signal and yielding an indication representative of the lobe, within said radiation pattern, in which said target is located in accordance with the frequency and phase relationship between said array output and said array oscillation signal.

2. The system of claim 1 wherein said means for oscillating oscillates said array through an angular excursion functionally determined from said distance $\gamma$ and the wavelength of said radiation.

3. The system of claim 1 wherein said means for oscillating oscillates said array through an angular excursion defined by the function $\rho = \arcsin \lambda/\gamma$ where:
    $\rho$ = said excursion
    $\lambda$ = the wavelength of said radiation
    $\gamma$ = said distance $\gamma$ 4. The system of claim 1 wherein said means for oscillating includes an oscillator generating said oscillating signal at a constant frequency $f_s$ and said array output contains an intensity component fluctuating at a frequency $2f_s$ when a target is present on said main lobe and an intensity component fluctuating at a frequency $f_s$ when a target is present on one of said side lobes.

5. The system of claim 4 wherein said means for receiving includes filter means for separating said $f_s$ and said $2f_s$ components, and phase determining means for comparing the phase of said $f_s$ component with the phase of said array oscillation signal to thereby identify which of said side lobes contains said target.

6. The system of claim 5 wherein said means for oscillating oscillates said array through an angular excursion defined by the function $\rho = \sin^{-1} \lambda/\gamma$ where:
    $\rho$ = said excursion
    $\lambda$ = the wavelength of said radiation
    $\gamma$ = the distance $\gamma$.

7. The system of claim 1 wherein said means for oscillating oscillates said array through an angular excursion equal to one-half the beam width of said main lobe.

8. The system of claim 5 wherein said means for oscillating oscillates said array through an angular excursion equal to one-half the beam width of said main lobe.

9. The system of claim 6 wherein said main lobe of said detector array has a width of $2 \sin^{-1} \lambda/\gamma$.

10. The system of claim 1 wherein said axis of said array is coincident with the centerline of said array.

11. The system of claim 1 wherein said radiation detectors are photodiodes located at the intersections of the lines of a right angle matrix.

* * * * *